United States Patent
McCline et al.

(10) Patent No.: US 9,058,351 B2
(45) Date of Patent: *Jun. 16, 2015

(54) APPARATUS AND METHOD FOR READ OPTIMIZED BULK DATA STORAGE

(71) Applicant: Pivotal Software, Inc., Palo Alto, CA (US)

(72) Inventors: Matthew C. McCline, Foster City, CA (US); Luke Lonergan, San Carlos, CA (US); Kurt Harriman, Novato, CA (US); John Glenn Eshleman, San Mateo, CA (US); Alon Goldshuv, Tel Aviv (IL); Jeffrey Ira Cohen, Sunnyvale, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/264,329

(22) Filed: Apr. 29, 2014

(65) Prior Publication Data

US 2014/0351202 A1    Nov. 27, 2014

Related U.S. Application Data

(63) Continuation of application No. 12/499,697, filed on Jul. 8, 2009, now Pat. No. 8,762,333.

(51) Int. Cl.
    *G06F 17/30* (2006.01)
(52) U.S. Cl.
    CPC ...... *G06F 17/3038* (2013.01); *G06F 17/30563* (2013.01); *G06F 17/30227* (2013.01)
(58) Field of Classification Search
    CPC .................. G06F 17/30368; G06F 17/30575; G06F 17/30356; G06F 17/30563; G06F 17/3058

USPC .......................................... 707/600, 607, 625
See application file for complete search history.

(56) References Cited

U.S. PATENT DOCUMENTS

| | | | |
|---|---|---|---|
| 6,353,835 B1 * | 3/2002 | Lieuwen | 1/1 |
| 7,840,575 B2 * | 11/2010 | Chandrasekaran | 707/754 |
| 2007/0271280 A1 | 11/2007 | Chandasekaran | |
| 2008/0027489 A1 | 1/2008 | Sheldon et al. | |
| 2008/0189248 A1 | 8/2008 | Chung | |
| 2009/0070330 A1 | 3/2009 | Hwang et al. | |
| 2009/0116496 A1 | 5/2009 | Savage et al. | |
| 2009/0132535 A1 | 5/2009 | Surtani et al. | |
| 2010/0174881 A1 * | 7/2010 | Anglin et al. | 711/162 |

OTHER PUBLICATIONS

Extended European Search Report from co-pending European Application No. EP 10797845, completed Dec. 10, 2013, 9 pages.
Greenplum Database 3.2 Administrator Guide, Oct. 1, 2008, XP008149266, retrieved from the internet, http;//docs.buihoo.com/greenplum/GPDB-3.2AdminGuide.pdf; Feb. 22, 2012, 849 pages.

* cited by examiner

*Primary Examiner* — Apu Mofiz
*Assistant Examiner* — Jared Bibbee
(74) *Attorney, Agent, or Firm* — Fish & Richardson P.C.

(57) ABSTRACT

A computer readable storage medium includes executable instructions to store load data in new rows of an append only table within a data warehouse, without updating or deleting existing rows in the append only table. The new rows are added in a database transaction that guarantees that the distributed reads and writes of all transactions are processed reliably and that the transactions obey snapshot isolation rules. Data changes associated with the load data are maintained in a separate update table. Data from the append only table is merged with data changes from the update table to supply read data.

20 Claims, 4 Drawing Sheets

APPARATUS AND METHOD FOR READ OPTIMIZED BULK DATA STORAGE

FIELD OF THE INVENTION

This invention relates generally to digital data storage and retrieval. More particularly, this invention relates to read optimized bulk data storage in data warehouse databases.

BACKGROUND OF THE INVENTION

Online Transaction Processing (OLTP) refers to a class of computer database systems that facilitate and manage transaction-oriented applications. As used herein, a transaction refers to a database transaction that immediately processes user requests. In OLTP, records are updated frequently and the design emphasis is on being able to find a small number of records and update them quickly and efficiently. OLTP transactions typically read fifty or fewer records and insert and/or update a smaller number of records.

A data warehouse database is a repository of an organization's electronically stored data. A data warehouse database provides an architecture for the flow of data from an operational system (e.g., an OLTP system) to a decision support system. In some instances, for example, a parallel database, queries can read billions of records at a time. In such systems, data is typically inserted in very large batches (e.g., a million) and updated far less frequently than in OLTP workloads.

Database transactions have a collection of properties called ACID (Atomicity, Consistency, Isolation, Durability) that guarantee a set of distributed reads and writes are processed reliably. Atomicity is the guarantee that either all of the writes of a transaction are performed or none of them are. Consistency guarantees that only valid data will be written to the database. Isolation is the guarantee that other transactions cannot access or see the data in an intermediate state during a transaction. Durability is the guarantee that once the user has been notified of success, the writes of a transaction will survive system failure and not be undone.

Many databases rely upon locking to provide ACID capabilities, especially those optimized for OLTP. Locks are acquired before reads and writes of database data. However, data warehouse databases can have billions of records, so maintaining a large number of locks or escalating to locks that cover ranges of rows is complex and has substantial overhead. A large number of locks also hurts concurrency performance. An alternative to locking is Multi-Version Concurrency Control (abbreviated as MVCC), in which the database maintains separate copies of records that are modified. This allows users to read data without acquiring any locks and is ideal for data warehouse databases. MVCC is a relaxation of the isolation ACID guarantee. MVCC is sometimes referred to as snapshot isolation.

Since OLTP records are updated frequently, the MVCC information varies significantly from record to record. OLTP databases are much smaller than data warehouse databases. Consequently, the per-record MVCC overhead is an immaterial issue for OLTP. On the other hand, in a data warehouse database, the per-record MVCC overhead is problematic. In a data warehouse, almost all the records have the same transaction snapshot versioning (MVCC) information because the insert transactions write large numbers of records and updates are less frequent. The information is very redundant and may become a significant disk space overhead. This overhead also reduces the data read rate.

In view of the foregoing, it would be desirable to provide an improved technique for implementing snapshot isolation to optimize a data warehouse database.

SUMMARY OF THE INVENTION

A computer readable storage medium includes executable instructions to store load data in new rows of an append only table within a data warehouse database, without updating or deleting existing rows in the append only table. The new rows are added in a database transaction that guarantees that the distributed reads and writes of all transactions are processed reliably and that the transactions obey snapshot isolation rules. Data changes associated with the load data are maintained in a separate update table. Data from the append only table is merged with data changes from the update table to supply read data.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
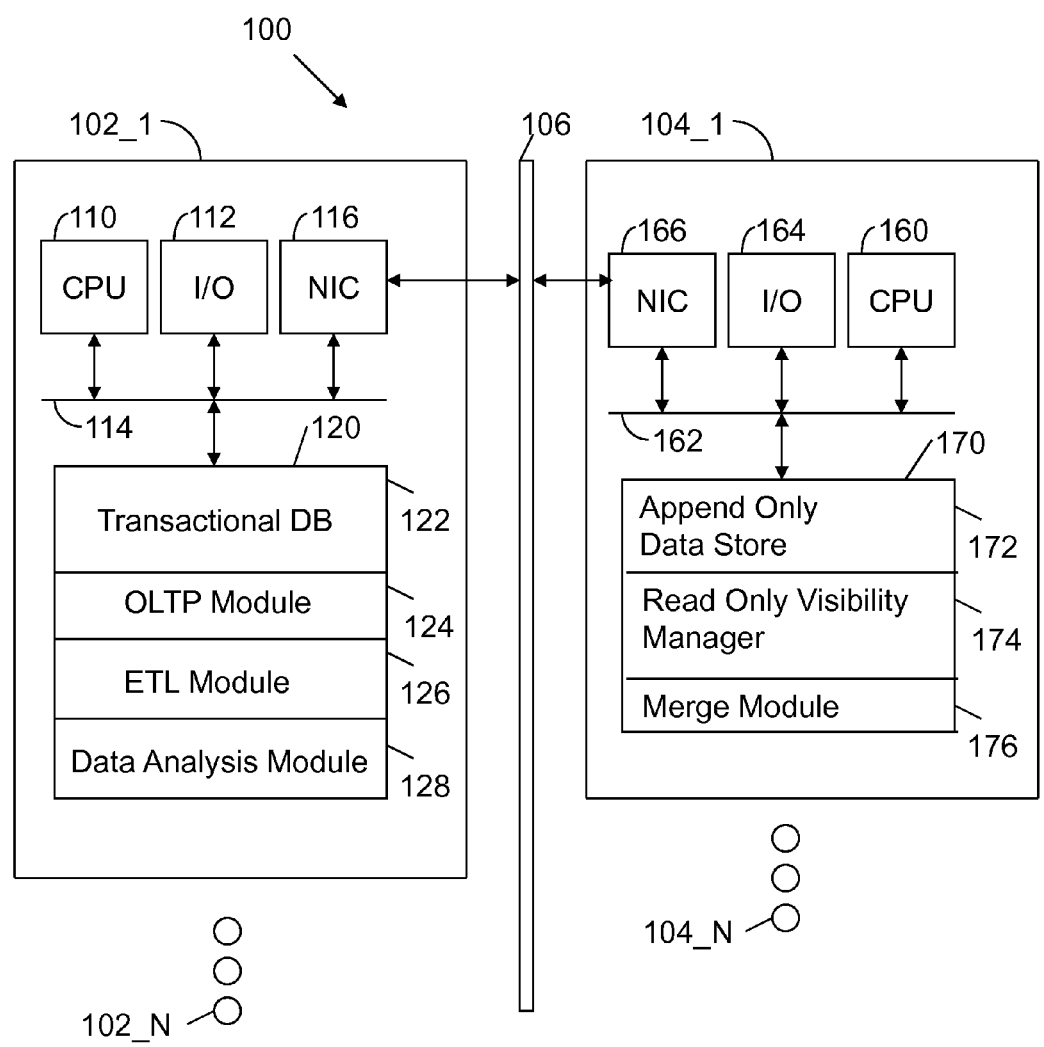
FIG. 1 illustrates a computer system configured in accordance with an embodiment of the invention.

FIG. 1 illustrates a computer system 100 configured in accordance with an embodiment of the invention. The system 100 includes a first set of computers 102_1 through 102_N and a second set of computer 104_1 through 104_N. In one embodiment, the first set of computers 102 supports transaction processing. In addition, the first set of computers support data migration operations to the second set of computers 104, which may operate as a data warehouse. The data warehouse supports read-optimized data storage in accordance with the invention.

Computer 102_1 includes standard components, such as a central processing unit 110 and input/output devices 112 connected via a bus 114. The input/output devices 112 may include a keyboard, mouse, display, printer and the like. A network interface circuit 116 is also connected to the bus to support communication with other computers 102 and/or 104. A memory 120 is also connected to the bus 114. The memory stores a transactional database 122. An Online Transaction Processing (OLTP) module 124 supports online transaction processing operations in connection with the transactional database 122.

The memory 120 also stores an Extract, Transform and Load (ETL) module 126. The ETL module extracts data from the transactional database 122, transforms it to fit specified criteria (e.g., a data quality level) and loads it into a target (e.g., a database or data warehouse). Accordingly, a database or data warehouse is populated with transactional data.

A data analysis module 128 may be used to analyze data in the transactional database 122. In addition, the data analysis module 128 may be used to analyze data migrated to a database or data warehouse supported by computers 104.

The invention has been implemented in connection with massively parallel databases of a data warehouse supported by hundreds of computational nodes. By way of example, one computational node may be computer 104_1, which includes standard components, such as a network interface circuit 166, input/output devices 164 and a central processing unit 160 linked by a bus 162.

A memory 170 is also connected to the bus 162. The memory includes an append only data store 172 configured in accordance with the invention. As discussed below, the append only data store 172 appends new rows to a table without updating or deleting existing rows. In addition, each row is simplified by eliminating transaction visibility information, which saves many bytes of information per row. The transaction visibility information may be eliminated by the ETL module 126 or by executable instructions associated with the append only data store 172.

Since data is appended directly to the append only table (e.g., it is forced to disk storage), it is not logged in a transaction log. This saves a write operation. In addition, since there is no transaction visibility information per row or tuple, there are no hint bits on any database block to be written. This saves another write operation.

The append only data store 172 is not updated with changed data information. Because there are no updates, tuples can be tightly packed. In addition, indices pointing to tuples in the region do not need to be updated.

A read only visibility manager 174 operates in conjunction with the append only data store 172. In particular, the read only visibility manager 174 controls access to the append only data store 172. As implied by its name, the read only visibility manager 174 determines regions of the append only data store 172 that are visible for read operations. Only read operations are performed in connection with the append only data store. This follows because the append only data store does not include any changed data information (i.e., written information).

The read only visibility manager 174 includes updated information associated with the data store. For example, the read only visibility manger 174 may include information to cancel out (delete) a row from the append only data store and/or add (update) new values to the append only data store 172. Thus, the read only visibility manager 174 processes the information that would otherwise be applied to the append only data store 172.

The merge module 176 includes executable instructions to read visible information from the append only data store 172. The merge module also reads data change information from the read only visibility manager 174. The merge module 176 deletes and updates values from the append only data store 172 as specified by the data change information from the read only visibility manager 174.

Figure 2:
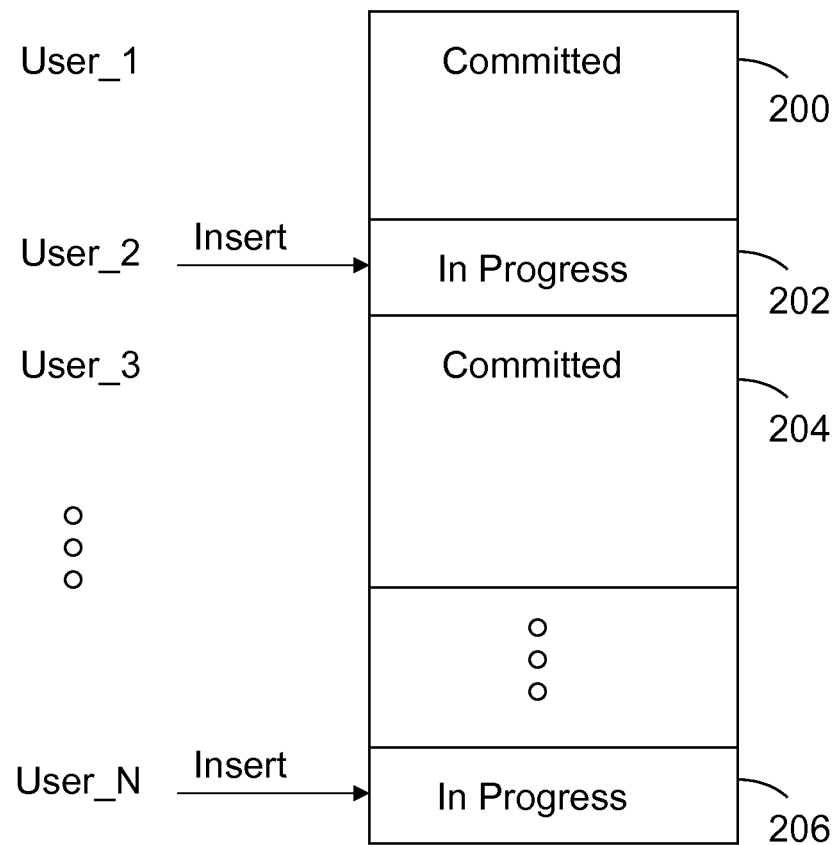
FIG. 2 illustrates a append only memory scheme utilized in accordance with an embodiment of the invention.

FIG. 2 illustrates an exemplary memory map for an append only data store. In this example, N users write to N different regions of memory. A user may be a machine, such as a machine operative in an ETL process. Each region can be considered a file. Since different users write to different regions, concurrent writing is supported. User_1 has a set of committed transactions in region 200. User_2 is in the process of inserting records in region 202. User_3 has a set of committed transactions in region 204, while User_N is in the process of inserting records in region 206. It should be appreciated that the memory store may be distributed across many machines. Indeed, the memory region or file for each user may be distributed across many machines.

Figure 3:
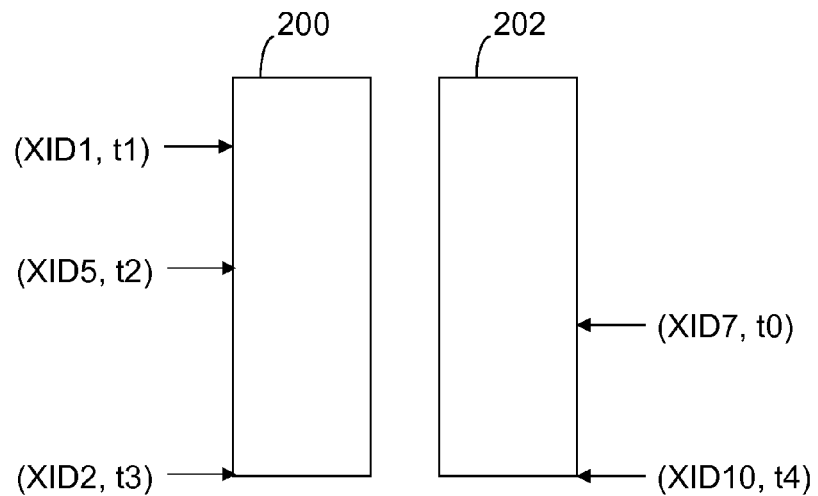
FIGS. 3 and 4 illustrate transaction id processing utilized in accordance with an embodiment of the invention.
Figure 4:
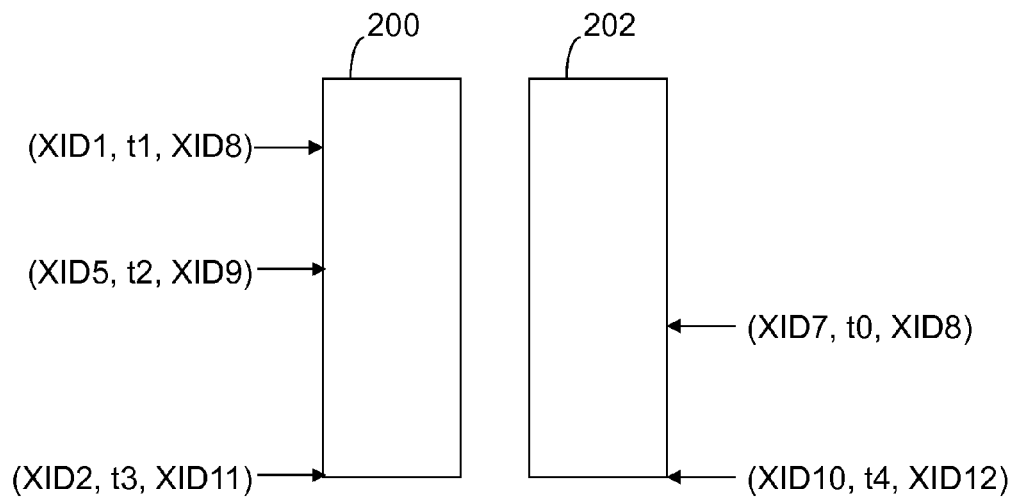

FIGS. 3 and 4 provide more detailed examples of memory write operations performed in accordance with an embodiment of the invention. Referring to FIG. 3, block 200 represents a first memory region assigned to a first user, while block 202 represents a second memory region assigned to a second user. When a write transaction is initiated, it is assigned a transaction identification number (XID#). The XID# is handed out at the transaction start time. The figure also illustrates a transaction completion time (t#). The larger the transaction completion time number, the later in time the transaction completed. Observe then that for an individual physical file, the file grows in commit time order. On the other hand, the files are not ordered by XID#. Accordingly, data visibility cannot be determined by ordering XID#s. However, a simplified data visibility scheme can be implemented by assigning XID#s upon completion of a write transaction to an append only memory region, as shown in FIG. 4.

FIG. 4 illustrates that data visibility can be computed by determining the proper effective End of File (EOF) boundary. This may be done by having the read only visibility manager 174 traverse the physical files change list from newest to oldest entries. If the completion XID for a region is less than the read request XID, then the data is visible to the read request. On the other hand, if the completion XID for a region is non-existent or greater than the read request XID, the region is not visible, since the read request started before commitment of a write operation.

Consider the example of a read request with an XID of 10. With reference to memory segment 200 of FIG. 4, the largest completion XID is 11, which is greater than the read request XID. Therefore, the region between XID11 and XID9 is not visible. However, since XID9 is less than 10, the remaining data is visible. That is, the data from the start of the file to XID9 is visible.

Now consider the same read request value in connection with memory block 202. Here, 10 corresponds to XID10, which means that this is the same transaction being written. Therefore, the tuples can be read. Since this section is visible, the entire memory block 202 is visible. In other words, once an insert transaction commits, the private area is made public as a potentially large range of newly committed records so other transactions can read the records.

The append only visibility manager 174 can trim the information maintained for each file. An end of file marker needs to be maintained. Thus, a simple list of file numbers and end of file positions may be maintained. It may be advisable to keep entries for the lowest active XID to provide an index into the file. Therefore, during maintenance, the read only visibility manager can scan the in-progress list of XIDs, find the smallest one and prune the remaining entries. Information in FIG. 4 is superfluous: one need not store the starting XID or the timestamp. Only the current XID (the end of file position) is required.

Figure 5:
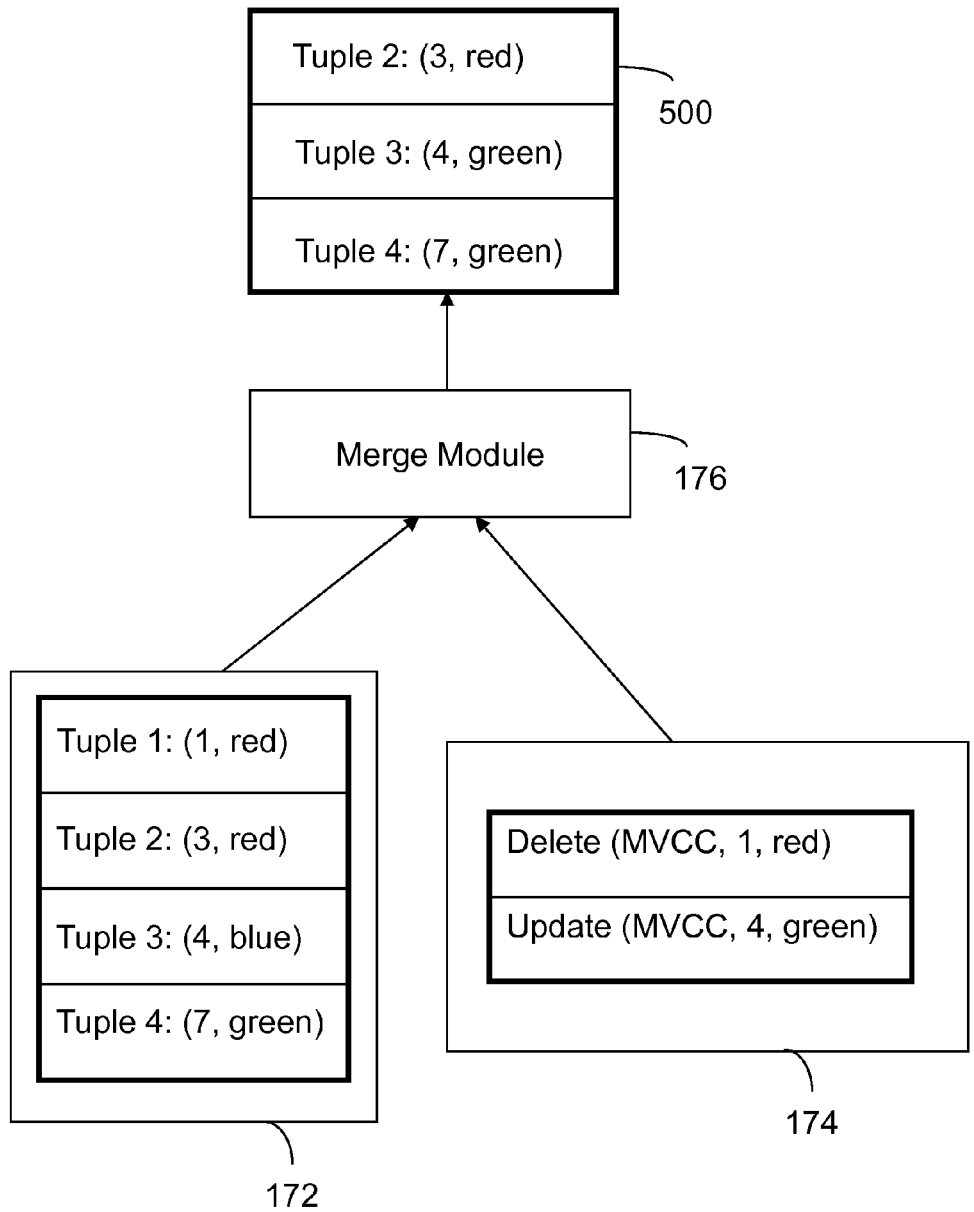
FIG. 5 illustrates merge processing utilized in accordance with an embodiment of the invention.

FIG. 5 illustrates an append only data store 172 with four tuples. The figure also illustrates a read only visibility manger 174 with update information that was not loaded into the append only data store 172. The merge module 176 includes executable instructions to merge the information from the append only data store 172 with the information from the read only visibility manager 174 to produce read data 500. In this example, Tuple 1 is eliminated from the read data 500 because of the delete instruction in the read only visibility manager 174. Tuples 2 and 3 are included in read data 500, while tuple 4 has an updated value of 7 (from its original value of 4). This follows because the update instruction in the read only visibility manager 174. The read data 500 can be read into private memory without contending through a shared memory buffered cache.

Observe that the read only visibility manger 174 also includes multi-version concurrency control (MVCC) information. The append only data store 172 does not include an MVCC header with each record. Instead, a small number of MVCC headers are maintained by the read only visibility manger 174. In order for append only tables to use an MVCC header to cover a large number of records, the insert must write in a private record storage area during the transaction. OLTP optimized storage is able to mix concurrent insert records at the page level because each record has an MVCC header. But since append only tables do not have an MVCC header per record, the records do not have the information needed to distinguish them from other concurrent insert records. Once an insert transaction commits, the private area is made public as a potentially large range of newly committed records so other transactions can read the records.

Therefore, each MVCC header characterizes a range of contiguous committed records. An append only table is a collection of contiguous committed ranges of records. Each range is covered by one MVCC header. The MVCC information allows a reader to determine which ranges of records of the append only table are committed with respect to the reader's transaction snapshot and just read those record ranges.

The number of committed records in a range is initially the number of records inserted in a single transaction. Later when a reorganize command is run, ranges are coalesced into larger ranges of committed records and fewer MVCC headers are used.

Although reference is made to the MVCC headers covering the record ranges, this information is simply records stored in a small table. Therefore, the visible system catalog OLTP optimized records have the visible record range information implicitly. A reorganization operation naturally merges ranges since a range is identified by the highest row number (end of file). That is, the high-water row numbers for older updates to the system catalog go away and leave the last highest committed row number as the end of the range.

The append only data store is typically used for data that will not be updated frequently, for example fact tables or a partition in a partitioned table. If a table is large or otherwise requires a significant time to load, an append only data table should be used. On the other hand, frequently updated dimension tables or small to medium size tables that return few rows should be treated in a conventional manner, such as OLTP optimized storage.

Those skilled in the art will recognize a number of benefits associated with the invention. For example, the invention includes a physical storage organization of data that physically co-locates all rows in a table for a given transaction next to each other in contiguous storage. There is minimum storage overhead to support MVCC. In addition, the invention supports fast and incremental replication to remote systems, avoids overhead of unnecessary buffer pool caching, and stores visibility metadata out of line from the table data. This results in performance enhancement for read operations and allows fast and simple replication with very-low overhead differentials. These features allow for the reduction of storage overhead for a 100 gigabyte of data warehouse record storage from approximately 100 gigabytes to approximately 100 kilobytes.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method, comprising:
appending new rows to an append only table, wherein appending new rows comprises:
concurrently writing a first and a second set of records for data storage in the append only table, wherein concurrently writing is performed by independently operating writers, the writers including a first data writer and a second data writer, and wherein concurrently writing comprises:
assigning a first memory region of the append only table to the first data writer;
assigning a second memory region of the append only table to the second data writer; and
writing the first set of records into the first memory region by the first data writer while writing the second set of records into the second memory region by the second data writer;
maintaining data change information that is applicable to the append only table;
receiving a read request to read data from the append only table;
determining that the first memory region is visible to the read request; and
producing read data in response to the read request, including:
reading one or more tuples from the first memory region;
reading the data change information; and
updating or eliminating one or more of the tuples as specified by the data change information.

2. The method of claim 1, wherein determining that the first memory region is visible to the read request comprises determining an end of file boundary of the first memory region by traversing a change list for the first memory region from newest to oldest entries in the change list.

3. The method of claim 1, further comprising:
upon completing the writing of the first set of records, assigning a first completion transaction identification to the first memory region; and
assigning a read request transaction identification to the read request to read data from the first set of records;
wherein determining that the first memory region is visible to the read request comprises determining that the first completion transaction identification was assigned before the read request transaction identification was assigned.

4. The method of claim 1, further comprising:
when writing the first set of records, assigning a first transaction identification to the first memory region; and
assigning a read request transaction identification to the read request to read data from the first set of records;
wherein determining that the first memory region is visible to the read request comprises determining that the first transaction identification equals the read request transaction identification.

5. The method of claim 1, wherein the data change information that is applicable to the append only table specifies that one or more rows are to be deleted from or updated in the append only table or both.

6. The method of claim 1, wherein the first memory region corresponds to a first file and the second memory region corresponds to a distinct second file.

7. The method of claim 1, wherein the first memory region and the second memory region are each distributed across a plurality of machines.

8. The method of claim 1, wherein writing the first set of records into the first memory region comprises writing in a private record storage area, and upon completing the writing of the first set of records, making the private record storage area public as a range of committed and readable records.

9. A computer readable storage medium, comprising executable instructions that, when executed by one or more computing devices, cause the one or more computing devices to perform operations comprising:
appending new rows to an append only table, wherein appending new rows comprises:
concurrently writing a first and a second set of records for data storage in the append only table, wherein concurrently writing is performed by independently operating writers, the writers including a first data writer and a second data writer, and wherein concurrently writing comprises:
assigning a first memory region of the append only table to the first data writer;
assigning a second memory region of the append only table to the second data writer; and
writing the first set of records into the first memory region by the first data writer while writing the second set of records into the second memory region by the second data writer;
maintaining data change information that is applicable to the append only table;
receiving a read request to read data from the append only table;
determining that the first memory region is visible to the read request; and
producing read data in response to the read request, including:
reading one or more tuples from the first memory region;
reading the data change information; and
updating or eliminating one or more of the tuples as specified by the data change information.

10. The computer readable storage medium of claim 9, wherein determining that the first memory region is visible to the read request comprises determining an end of file boundary of the first memory region by traversing a change list for the first memory region from newest to oldest entries in the change list.

11. The computer readable storage medium of claim 9, comprising executable instructions that, when executed by one or more computing devices, cause the one or more computing devices to perform operations comprising:
upon completing the writing of the first set of records, assigning a first completion transaction identification to the first memory region; and
assigning a read request transaction identification to the read request to read data from the first set of records;
wherein determining that the first memory region is visible to the read request comprises determining that the first completion transaction identification was assigned before the read request transaction identification was assigned.

12. The computer readable storage medium of claim 9, comprising executable instructions that, when executed by one or more computing devices, cause the one or more computing devices to perform operations comprising:
when writing the first set of records, assigning a first transaction identification to the first memory region; and
assigning a read request transaction identification to the read request to read data from the first set of records;
wherein determining that the first memory region is visible to the read request comprises determining that the first transaction identification equals the read request transaction identification.

13. The computer readable storage medium of claim 9, wherein the data change information that is applicable to the append only table specifies that one or more rows are to be deleted from or updated in the append only table or both.

14. The computer readable storage medium of claim 9, wherein the first memory region corresponds to a first file and the second memory region corresponds to a distinct second file.

15. The computer readable storage medium of claim 9, wherein the first memory region and the second memory region are each distributed across a plurality of machines.

16. The computer readable storage medium of claim 9, wherein writing the first set of records into the first memory region comprises writing in a private record storage area, and upon completing the writing of the first set of records, making the private record storage area public as a range of committed and readable records.

17. A system, comprising one or more computing devices for operating a data warehouse, the one or more computing devices comprising an append only data store, a read only visibility manager, and a merge module;
wherein the append only data store appends new rows to an append only table, wherein appending new rows comprises:
concurrently writing a first and a second set of records for data storage in the append only table, wherein concurrently writing is performed by independently operating writers, the writers including a first data writer and a second data writer, and wherein concurrently writing comprises:
assigning a first memory region of the append only table to the first data writer;

assigning a second memory region of the append only table to the second data writer; and writing the first set of records into the first memory region by the first data writer while writing the second set of records into the second memory region by the second data writer;

wherein the read only visibility manager is configured to control access to the append only data store, wherein controlling access comprises:

maintaining data change information that is applicable to the append only table; and determining that a particular memory region is visible to a read request to read data from the append only table; and wherein the merge module is configured to produce read data in response to the read request, wherein producing read data comprises:

reading one or more tuples from the particular memory region;

reading the data change information; and updating or eliminating one or more of the tuples as specified by the data change information.

18. The system of claim 17, wherein determining that the particular memory region is visible to the read request comprises determining an end of file boundary of the particular memory region by traversing a change list for the particular memory region from newest to oldest entries in the change list.

19. The system of claim 17, wherein the first memory region corresponds to a first file and the second memory region corresponds to a distinct second file.

20. The system of claim 17, wherein the first memory region and the second memory region are each distributed across a plurality of machines.

* * * * *

UNITED STATES PATENT AND TRADEMARK OFFICE
CERTIFICATE OF CORRECTION

| | | |
|---|---|---|
| PATENT NO. | : 9,058,351 B2 | Page 1 of 1 |
| APPLICATION NO. | : 14/264329 | |
| DATED | : June 16, 2015 | |
| INVENTOR(S) | : McCline | |

It is certified that error appears in the above-identified patent and that said Letters Patent is hereby corrected as shown below:

On the title page item [56], column 2, line 4: Delete "buihoo" and insert -- huihoo --, therefor.

Signed and Sealed this
Ninth Day of February, 2016

Michelle K. Lee
*Director of the United States Patent and Trademark Office*